April 4, 1950 G. W. LANGFORD ET AL 2,503,055
BRAKE LINING CLAMPING DEVICE
Filed Dec. 31, 1947 2 Sheets-Sheet 1

Inventors:
George W. Langford
George R. Langford
By Wallace and Cannon
Attorneys April 4, 1950   G. W. LANGFORD ET AL   2,503,055
BRAKE LINING CLAMPING DEVICE
Filed Dec. 31, 1947   2 Sheets-Sheet 2
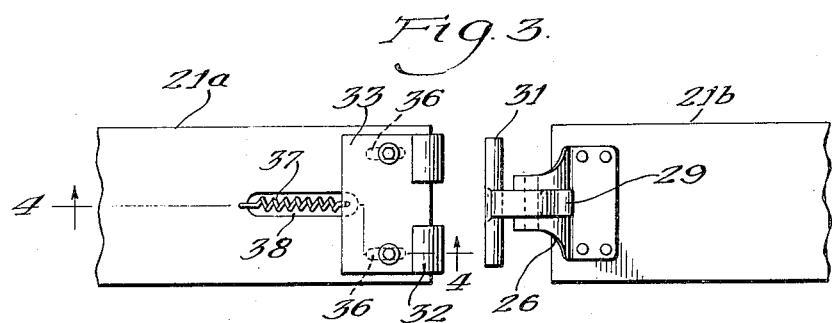
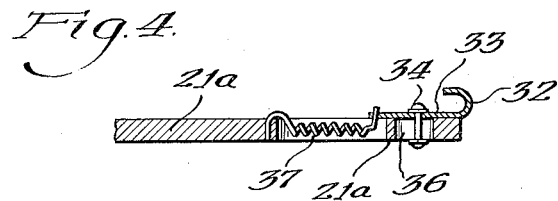
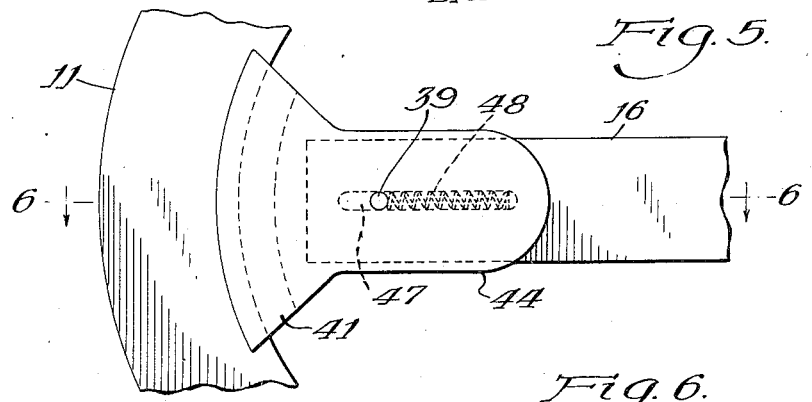
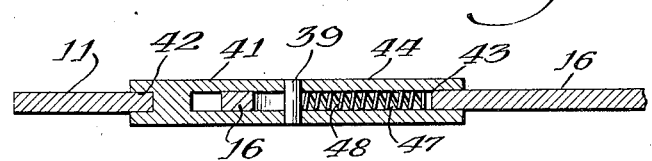
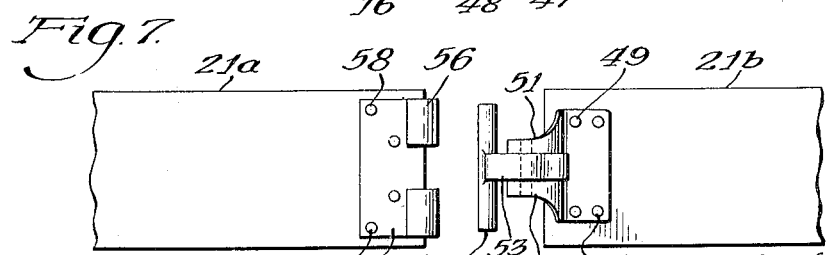
Inventors:
George W. Langford
George R. Langford
By Wallace and Cannon
Attorneys Patented Apr. 4, 1950

2,503,055

UNITED STATES PATENT OFFICE 2,503,055

BRAKE LINING CLAMPING DEVICE

George W. Langford and George R. Langford, Ann Arbor, Mich., assignors to Dura-Bond, Incorporated, Ann Arbor, Mich., a corporation of Michigan Application December 31, 1947, Serial No. 795,081

10 Claims. (Cl. 154—1)

1

This invention relates to the art of securing brake linings to brake shoes and particularly to improvements in devices for clamping or holding a brake shoe and the lining therefor while the lining is cemented to the brake shoe.

Brake linings have heretofore been secured to brake shoes by means of rivets which are countersunk in the linings and fastened to the flange of the brake shoe. It has now been proposed that thermo-setting adhesive materials having good resistance to shearing forces set up during the braking operation, and also to heat induced by friction, be employed as a cement for holding the brake lining to the brake shoe. In order for such an adhesive to bind the lining firmly to the shoe, it is of course necessary to clamp the shoe and the lining together with the cementing material in between the shoe and the lining and then to heat the shoe and lining and the cementing material to a curing temperature at which the cement sets up and secures the lining to the shoe and it is a principal object of the invention to enable this to be accomplished in a simple and expeditious manner.

Another object is to cement brake lining to a brake shoe in such a manner that the pressure applied between the lining against the brake shoe during the cementing process is uniform, with the result that the bond of the lining to the brake shoe is evenly distributed over the entire adhesively coated area.

Still another object is to secure the lining to a pair of shoes at a time, the shoes being spaced by a strut or spacer member engaging the web of the shoes, and the flanges of the shoes being encircled by a split flexible band which may readily be positioned to provide a temporary assembly for holding the brake lining and the cementing material tightly against the flange during the process of setting the cement.

Yet another object is to cement brake linings to brake shoes by the employment of thermo-setting materials which will resist heat developed in the braking operation, the process of cementing the linings to the brake drums being characterized by the application of a substantially uniform pressure between the lining and the drum irrespective of the temperature employed in causing the cement to set.

Other and further objects of the invention will

2 be apparent from the following description and claims taken together with the accompanying drawings which, by way of illustration, shows preferred embodiments which the invention may assume in practice. Other embodiments of the invention employing the same or equivalent principle may be used and structural changes may be made as desired by those skilled in the art without departing from the present invention and the purview of the appended claims.

In the drawings:

Fig. 3 is a top view showing details of the locking arrangement of Fig. 1;

Fig. 4 is a section taken along the line 4—4 of Fig. 3;

Fig. 5 is an alternate form of the spacer shown in Fig. 2;

Fig. 6 is a section taken along the line 6—6 of Fig. 5; and

Fig. 7 is a top view of an alternate form of locking arrangement which is employed with the spacer shown in Figs. 5 and 6.

Figure 1:
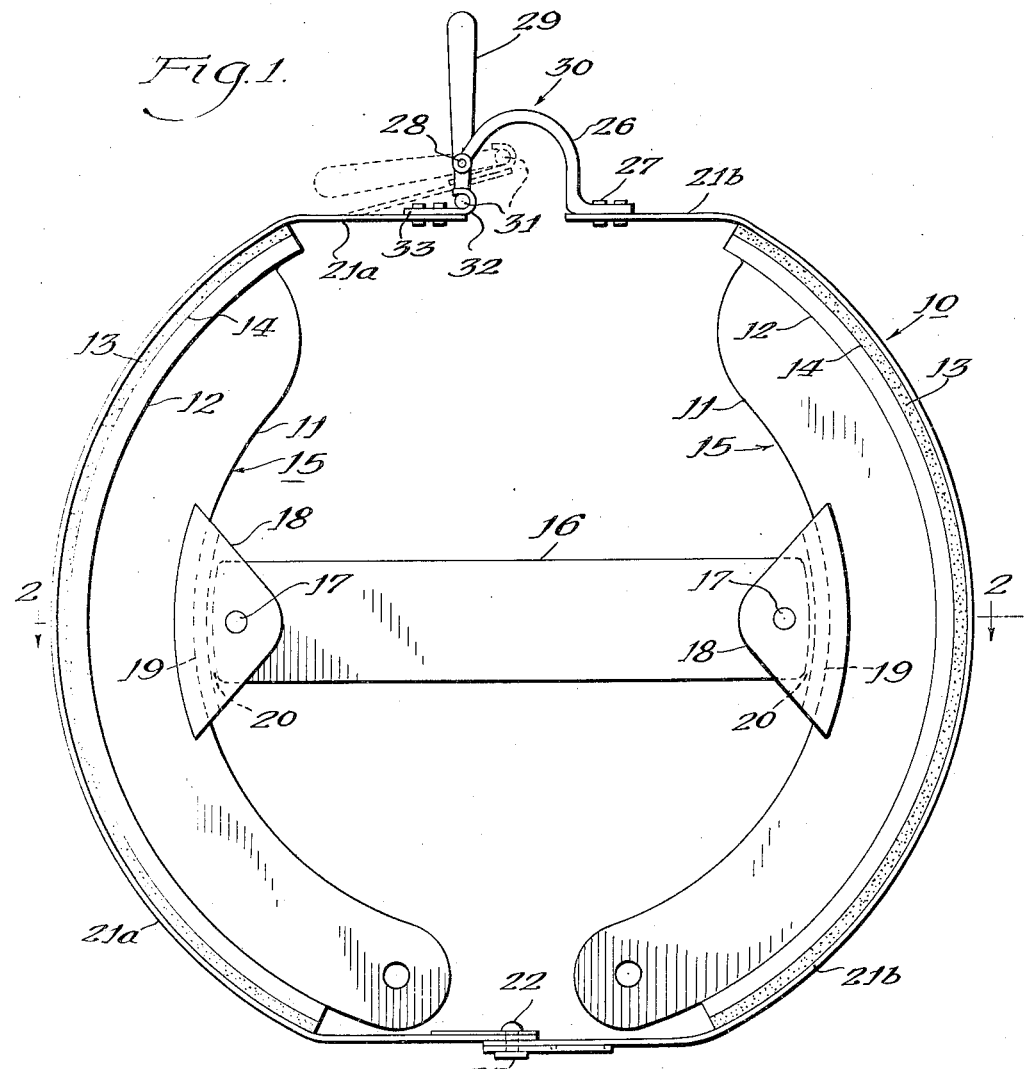
Fig. 1 is a front view of a brake lining clamp according to the present invention.
Figure 2:
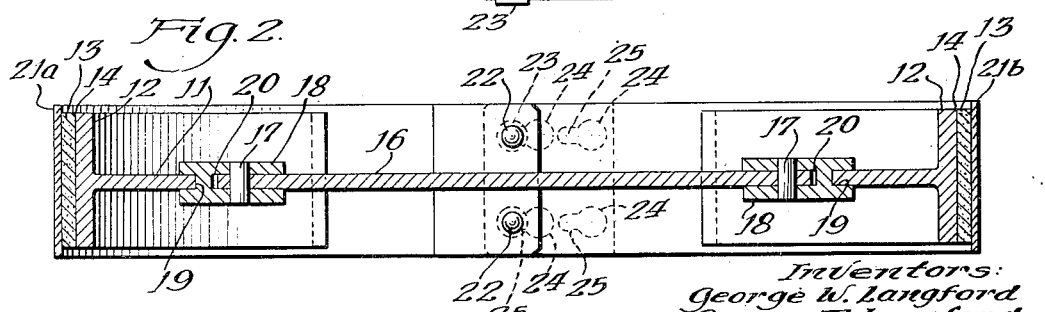
Fig. 2 is a section taken along the line 2—2 of Fig. 1.

Referring now to the drawings, the invention is illustrated in Figs. 1 to 3 as embodied in a brake lining clamp 10 and is shown as being applied to a pair of brake shoes 15 consisting of webs 11 which are integral with flanges 12 to which brake linings 13 are respectively secured by means of an adhesive cementing layer or strip 14 of thermosetting material which is heated to the setting temperature with the linings 13 firmly clamped to the flanges 12 by means as will later be described.

Means are provided for maintaining the brake shoes 15 in spaced relationship and for clamping the linings 13 to the brake shoes 15 along their webs 11, and to this end, as shown in Figs. 1 and 2, there is provided a strut or spacer 16 having secured at the ends thereof by means of pins 17 substantially triangular shaped members 18 which are arcuately slotted as at 19 to straddle and engage the webs 11. In order to permit the members 18 to turn slightly about the pins 17 so as to thereby render the members 18 in effect self-adjusting a small amount of clearance 20 is provided at the ends of the strut 16.

The brake shoes 15 which are thus held in spaced relationship are adapted to be clamped in such spaced relationship with the linings 13 and the cementing layers 14 bearing against the flanges 12, and this is accomplished by means of a band formed into substantial halves or sections 21a and 21b which are connected together by headed pins 22, secured to the section 21a. The pins 22 have heads 23 adapted to pass through openings 24 in the section 21b, the shank of the pins 22 being adapted to ride in slots 25 formed as extensions of the opening 24. As shown in Fig. 2, the length of the band, consisting of sections 21a and 21b, may be adjusted by positioning the pin 22 in either pair of slots 25 shown, and this enables the apparatus to be applied to different sizes of brake shoes.

The band sections 21a and 21b are locked around the brake shoes 15 with the spacer 16 in the position shown in Figs. 1 and 2 by means of a toggle type of lock or clamp indicated generally at 30. The lock 30 consists of a goose neck 26 riveted to the band section 21b as at 27, and fulcrumed at the end of the goose neck 26 as at 28 is a toggle arm 29 having a T-shaped portion 31, Fig. 3, which is adapted to engage a pair of hook-like fingers 32 which are formed in a hook plate 33 which is fastened to the band section 21a by means of rivets 34 passing through a slot 36 formed in the band section 21a. It will be seen that the hook plate 33 with the fingers 32 will be permitted to have some movement relative to the band section 21a limited only by the dimensions of the slots 36. The hook plate 33 is constantly subjected to a pulling force to the left, as seen in Fig. 3, by means of a helical spring 37 positioned in a slot 38 formed in the band section 21a, the other end of the spring 37 being secured in any convenient manner to the hook plate 33. The spring 37 is preferably one deforming but very slightly under the application of a load, and preferably one which will maintain its spring-like qualities irrespective of the heat to which it will be subjected.

The device thus described affords a simple and convenient means for cementing brake linings to brake shoes by means of cement having thermosetting properties. In using the device according to the present invention the flanges 12 of the brake shoes 15 have first removed therefrom all vestiges of worn brake lining. The cementing strip or layer 14 is then placed against the flange 12, and the brake lining 13, which is preferably premolded, is then placed against the cementing strip 14. The cementing strip may take the form of a paper strip, impregnated through all or selected portions thereof with a suitable thermosetting adhesive or bonding material, but it will be understood that such bonding material may be applied directly to either the flanges 12 of the lining 13 if desired. The shoes 15 are then positioned properly by means of the spacer 16, the members 18 thereof engaging the webs 11 of the brake shoes 15. The split band sections 21a and 21b which are held together by the headed pins 22 in the proper relation as determined by the size of the brake shoes, are then placed around the brake shoes 15, and the T-portion 31 of the toggle arm 29 is caused to engage the hooks 32 of the plate 33. The toggle arm 29 is then rocked about the pivot 28 to an over-center locking position shown in dotted outline in Fig. 1. In this position of the toggle arm 29 the band sections 21a and 21b are held firmly around the brake shoes 15, thereby holding the brake linings 13 firmly against the flanges 12 with the cementing strip 14 or other suitably applied adhesive therebetween with substantially uniform pressure. The assembly just described is then heated to a curing temperature at which the cementing strip 14 will firmly cement the brake linings 13 to the flanges 12 of the brake shoes 15. The pressure between the brake lining 13 and the flange 12 will, because of the load in the spring 37, remain substantially unchanged during the heating process, thereby developing the full bond of the lining 13 to the flange 12.

An alternative embodiment of the invention is shown with reference to Figs. 5, 6 and 7 wherein there is shown an alternate form of the spacer for positioning the brake shoes 15 and for locking the band sections 21a and 21b around the brake shoes 15 with the brake linings 13 held in place. In the alternate form shown in Figs. 5 and 6 the spacer member 16 is arranged to space the brake shoes and engage them along the webs 11 as in the other embodiment just described, the spacer 16 being provided with spring means to insure proper clamping pressure at all times. As shown, the spacer 16 has pin connected thereto at 39 a web engaging member 41 which is slotted as at 42 to straddle the web 11. The web engaging member 41 is also provided with a longer slot 43 and is formed to provide portions 44 and 46 which also straddle the spacer 16. As shown in Fig. 5, the spacer 16 has a slot 47 which receives a spring 48 abutting one end of the slot 47, the other end of the spring 48 abutting the pin 39. It will thus be apparent that the web engaging member 41 is arranged to have pivotal movement as well as longitudinal movement relative to the spacer 16, and that the spring 48 constantly tends to urge members 41 and 16 apart, limited only by the pin 39 impinging against the end of the slot 47. The spring 48 is preferably a very strong one which will deform but slightly on the application of any load thereon, and which will not be appreciably reduced in its resiliency by the application of heat necessary to effect setting of the thermosetting material in the cementing strip 14. It is not necessary, of course, that the spacer shown in Figs. 5 and 6 be provided with spring biased web engaging members at each end, only one such arrangement being necessary, the other end of the spacer being provided as shown in Figs. 1 and 2.

Referring now to Fig. 7, there is shown a top view of an alternate embodiment of a locking device for the band sections 21a and 21b to be used with the spacer arrangement shown in Figs. 5 and 6. In the embodiment shown in Fig. 7 the band section 21b has secured thereto at 49 a goose neck 51, in the end of which is pivoted, as at 52, a toggle arm 53 which has T-shaped extensions 54 adapted to engage hooks 56 formed in a plate 57 secured in a fixed relation to the band 21a by rivets 58.

With the locking means shown in Fig. 7 moved to the locked position similar to that shown in the dotted outline of Fig. 1, there will be a constant thrust directed against the webs 11 of the brake shoes 15 which is caused by the load in the spring 48. It will also be apparent that the thrust created by the load in spring 48 will be such as to develop substantially uniform pressure by the clamping band sections 21a and 21b against the lining 13, the cementing strips 14 and the flanges 12 of the brake shoes 15. With the device thus assembled, the brake shoes 15 may be heated to such temperature as will cause the cementing material in the strips 14 to set up and cement the linings to the flanges 12, in a manner like that described with reference to Figs. 1 to 4.

From the foregoing description it will be apparent that the present invention enables brake lining to be adhesively secured to brake shoes in an extremely simple manner, and under the present invention the clamping means whereby the lining elements are clamped to the brake shoes are of such a character that a pair of brake shoes may be lined in a single operation. Moreover, after the brake lining material has been clamped in position on a pair of brake shoes, the pair of brake shoes and the clamping elements constitute a relatively small and readily portable assembly so that this assembly may be readily and easily placed in or removed from the curing oven.

It will also be evident that under the present invention the clamping means are of a simple character and may be applied to different sizes of brake shoes, and because of this, the amount of equipment required in an automotive repair shop for use in adhesively securing brake lining to brake shoes is maintained at an absolute minimum. It will also be clear that the clamping means may be applied to a set of brake shoes in an extremely simple manner, and after the linings have been clamped in position on a set of brake shoes, the requisite clamping pressure will be maintained throughout the curing period by reason of the resilient forces applied between the spacing element and the band element of the clamping structure. As another important aspect of the present invention it should be noted that the clamping bands and the spacers or separator bars are relatively light in weight so as to reduce the time and expense required to heat the assembly to the proper curing temperatue.

Thus, while we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A brake lining clamp adapted for use in cementing brake linings to brake shoes, comprising means for holding said brake shoes in spaced relationship, a band encircling said brake shoes and in contact with said linings, and means for contracting and locking said band under a clamping tension around said brake shoes and said linings.

2. A brake lining clamp adapted for use in cementing brake linings to brake shoes, comprising spacing structure engaging said brake shoes and holding said brake shoes in spaced relationship, a band structure encircling said brake shoes and in contact with said brake lining, operating means for contracting and locking said band structure around said brake shoes and said brake linings, and resilient means associated with the one of said structures and placed under tension by said operating means for maintaining clamping tension in said band means and said spacing means.

3. A brake lining clamp adapted for use in cementing brake linings to brake shoes, comprising means engaging said brake shoes and holding said brake shoes in spaced relationship, a band encircling said brake shoes and in contact with said brake lining, means for contracting and locking said band around said brake shoes and said brake linings, and resilient means associated with the first said means for maintaining tension in said band.

4. A brake lining clamp adapted for use in cementing brake linings to brake shoes, comprising means engaging said brake shoes for holding said brake shoes in spaced relationship, a band encircling said brake shoes and in contact with said brake lining, means for contracting and locking said band around said brake shoes and said brake linings, and spring means associated with the locking means for maintaining tension in said band.

5. In a brake lining clamp adapted for use in cementing brake lining to a brake shoe of the type consisting of a web and a flange to which said brake lining is cemented a strut having web engaging members for engaging and holding a pair of shoes in spaced relationship, a band encircling said shoes and in contact with said lining, means for contracting and locking said band around said shoes and said linings, and means for maintaining tension in said band.

6. A brake lining clamp adapted for use in cementing brake lining to a brake shoe of the type consisting of a web and a flange to which said brake lining is cemented; comprising a spacer including a bar and members connected to the ends of said bar, said members being slotted and adapted to engage said webs for holding said shoes in spaced relationship, a band encircling said shoes and in contact with said lining, means for contracting and locking said band around said shoes and said linings, and means for maintaining tension in said band.

7. A brake lining clamp adapted for use in cementing brake lining to a brake shoe of the type consisting of a web and a flange to which said brake lining is cemented; comprising means for holding said brake shoes in spaced relationship, a flexible band for encircling said shoes and in contact with said lining, means for contracting and locking said band around said shoes and said linings, and spring means associated with said band for maintaining tension in said band.

8. A brake lining clamp adapted for use in cementing brake lining to a brake shoe of the type consisting of a web and a flange to which said brake lining is cemented and comprising a spacer including a bar and members connected to the ends of said bar, said members being slotted and adapted to engage said web for holding said shoes in spaced relationship, a band for encircling said shoes and in contact with said lining, operating means for contracting and locking said band to clamp said lining between said shoes and said band, and spring means associated with said spacer and placed under tension by said operating means for maintaining tension in said band.

9. A brake lining clamp adapted for use in cementing brake lining to a brake shoe of the type consisting of a web and a flange to which said brake lining is cemented and comprising a spacer including members engaging said webs and a band encircling said shoes and in contact with said linings, means for contracting and locking said band around said shoes and said linings, and means for adjusting the length of said band in accordance with the size of said shoes.

10. In a brake lining clamp adapted for use in cementing brake lining to a brake shoe of the type consisting of a web and a flange to which said brake lining is cemented, a spacer means including members engaging said webs and a band means encircling said shoes and in contact with said linings, means for contracting and locking said band means around said shoes and said linings, means for adjusting the length of said band means in accordance with the size of said shoes, and means associated with one of said other means for maintaining clamping tension on the linings.

GEORGE W. LANGFORD.
GEORGE R. LANGFORD.

REFERENCES CITED

The following references are of record in the file of this patent:

UNITED STATES PATENTS

| Number | Name | Date |
|---|---|---|
| 1,598,561 | Commer | Aug. 31, 1926 |
| 1,869,343 | Parker | July 26, 1932 |
| 2,358,483 | Tilden | Sept. 19, 1944 |
| 2,433,760 | Janes | Dec. 30, 1947 |